United States Patent
Ohhashi

(10) Patent No.: US 12,536,622 B2
(45) Date of Patent: Jan. 27, 2026

(54) INFORMATION PROCESSING DEVICE, INFORMATION PROCESSING METHOD, AND INFORMATION PROCESSING SYSTEM

(71) Applicant: Socionext Inc., Kanagawa (JP)

(72) Inventor: Kazuyuki Ohhashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 332 days.

(21) Appl. No.: 18/457,879

(22) Filed: Aug. 29, 2023

(65) Prior Publication Data

US 2023/0401678 A1  Dec. 14, 2023

Related U.S. Application Data

(63) Continuation of application No. PCT/JP2021/008457, filed on Mar. 4, 2021.

(51) Int. Cl.
*G06T 5/00* (2024.01)
*G06T 5/70* (2024.01)

(52) U.S. Cl.
CPC ...... *G06T 5/70* (2024.01); *G06T 2207/10028* (2013.01); *G06T 2207/20081* (2013.01); *G06T 2207/20084* (2013.01); *G06T 2207/30252* (2013.01)

(58) Field of Classification Search
CPC ............. G06T 5/70; G06T 2207/10028; G06T 2207/20081; G06T 2207/20084; G06T 2207/30252
See application file for complete search history.

(56) References Cited

U.S. PATENT DOCUMENTS

| | | | |
|---|---|---|---|
| 10,719,759 B2 | 7/2020 | Kutliroff | |
| 10,726,570 B2 | 7/2020 | DeTone et al. | |
| 11,194,027 B1* | 12/2021 | Subasingha | G01S 7/493 |
| 11,315,220 B2* | 4/2022 | Ida | G06N 3/09 |
| 11,354,779 B2* | 6/2022 | Xu | G06T 5/20 |

(Continued)

FOREIGN PATENT DOCUMENTS

| | | |
|---|---|---|
| JP | 2010-273112 A | 12/2010 |
| JP | 2016-024598 A | 2/2016 |

(Continued)

OTHER PUBLICATIONS

International Search Report (ISR) dated May 25, 2021 issued in International Patent Application No. PCT/JP2021/008457, with English translation.

*Primary Examiner* — Gregory M Desire
(74) *Attorney, Agent, or Firm* — Rimon P.C.

(57) ABSTRACT

An information processing device includes a memory and a processor configured to obtain first point group information that represents three-dimensional positional information, by using image data captured by a first camera; output second point group information obtained by reducing noise of the first point group information, by using one or more filters; and set filter coefficients of the one or more filters, by using (i) a filter coefficient estimation model trained in advance by using (a) test data for learning that includes image data captured by a second camera and (b) training data based on third point group information that represents three-dimensional positional information obtained by a position sensor, and (ii) observation data that includes the image data captured by the first camera.

7 Claims, 16 Drawing Sheets

(56) References Cited

U.S. PATENT DOCUMENTS

| | | | |
|---|---|---|---|
| 11,393,169 B2* | 7/2022 | Fukuma | G06F 18/214 |
| 11,854,564 B1* | 12/2023 | Chatlani | G10L 15/16 |
| 12,055,632 B2* | 8/2024 | Sharma | G01S 17/48 |
| 2010/0296701 A1 | 11/2010 | Hu | |
| 2019/0094027 A1 | 3/2019 | Xu et al. | |
| 2020/0097772 A1 | 3/2020 | Nakanishi et al. | |

FOREIGN PATENT DOCUMENTS

| | | |
|---|---|---|
| JP | 2020-052513 A | 4/2020 |
| WO | 2018/235219 A1 | 12/2018 |

* cited by examiner

FIG.4A
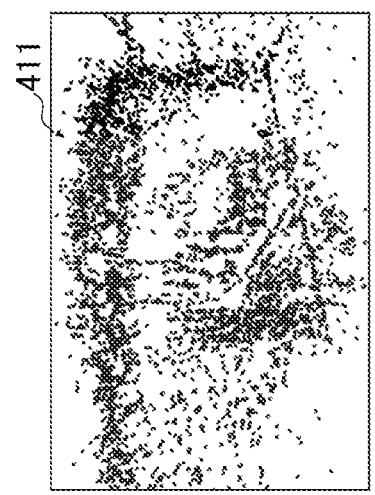

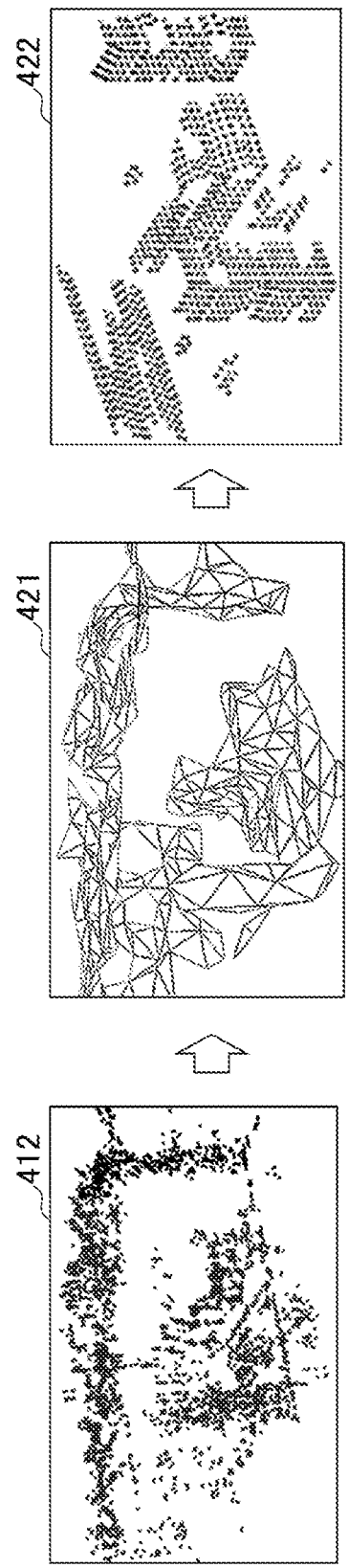

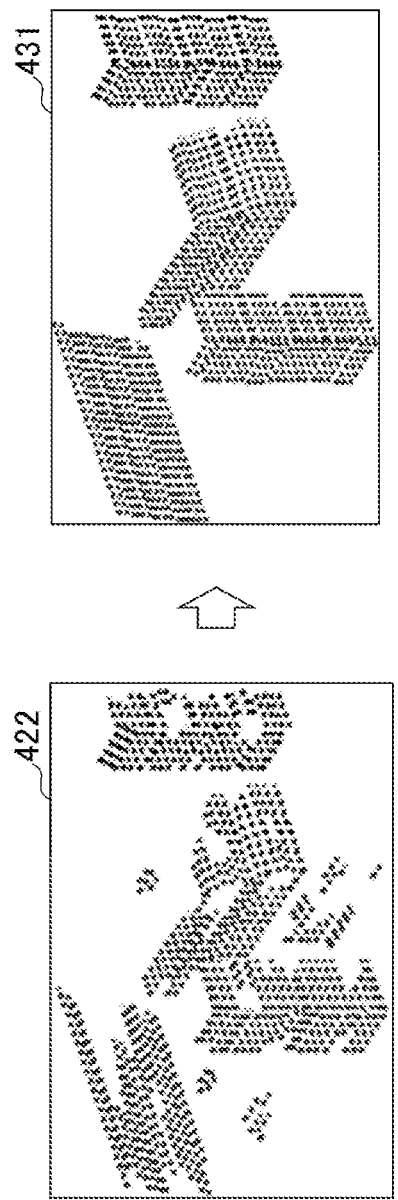

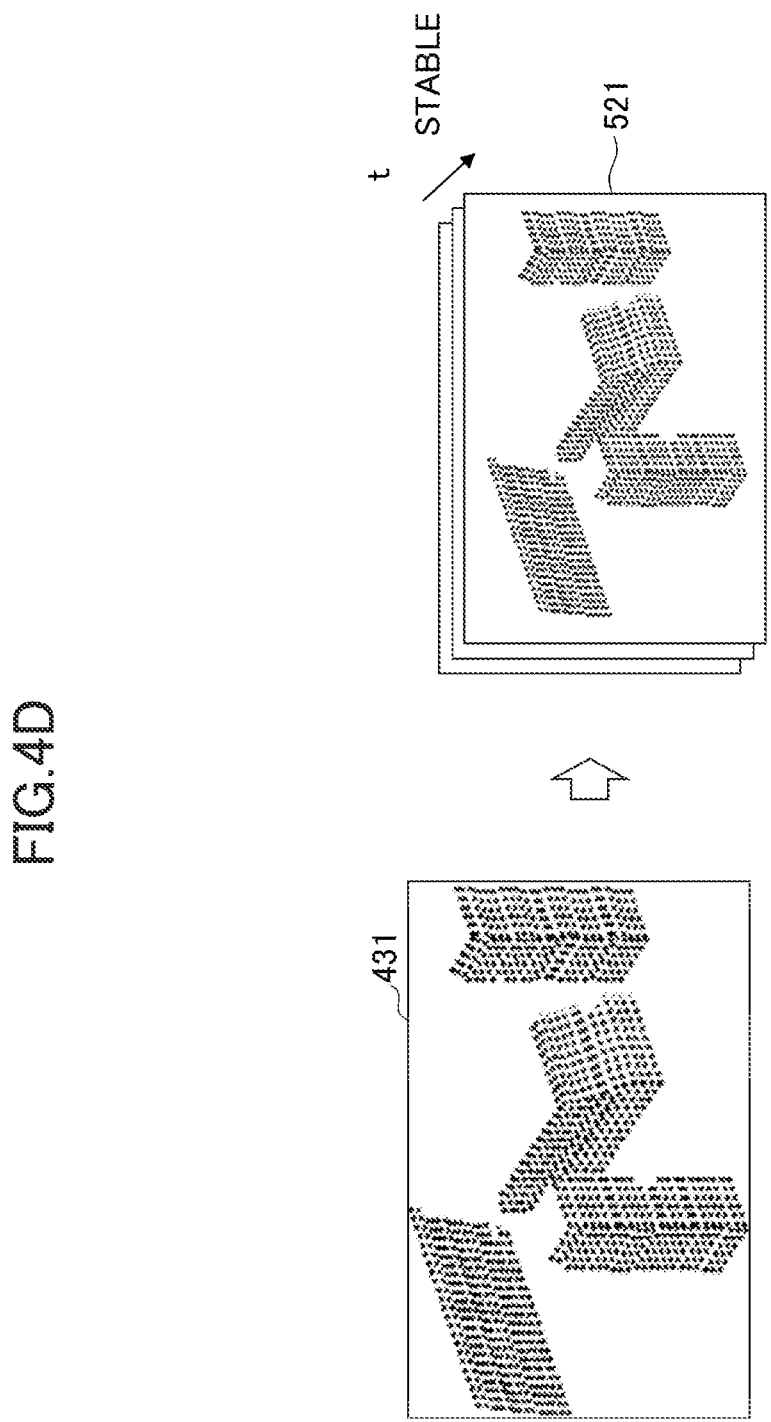

FIG.4E

|  | a | b | c | d | e | f | g | h | i | j | k | l |  |
|---|---|---|---|---|---|---|---|---|---|---|---|---|---|
| SCENE A: | 50 | 1.0 | 2 | 2000 | 4 | 10 | 10 | 4 | 2 | 3 | 4 | 5 | ※STRONG NR |
| SCENE B: | 10 | 0.1 | 0 | 1000 | 2 | 20 | 5 | 3 | 1 | 2 | 3 | 3 | ※WEAK NR |

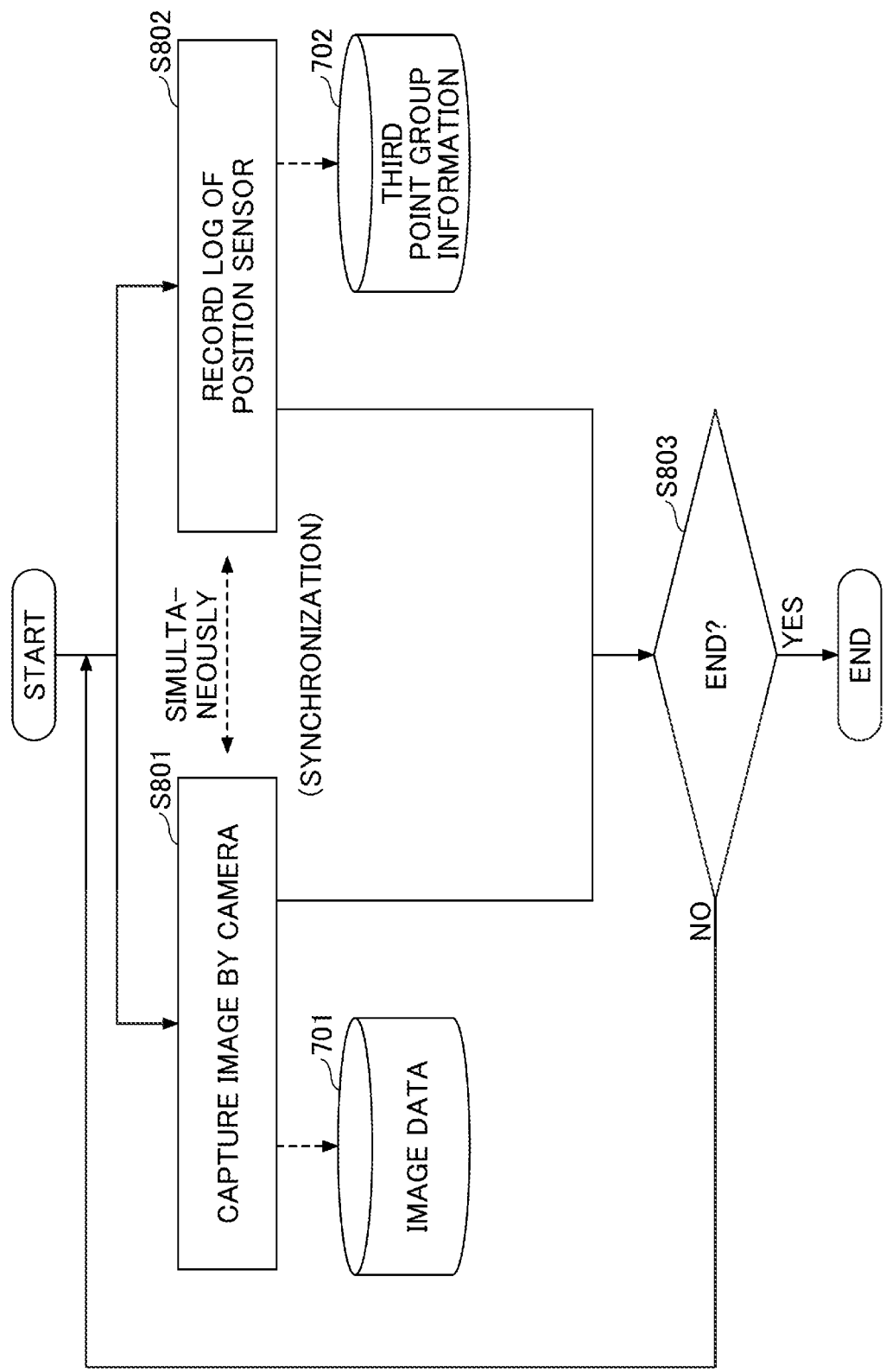

INFORMATION PROCESSING DEVICE, INFORMATION PROCESSING METHOD, AND INFORMATION PROCESSING SYSTEM

CROSS-REFERENCE TO RELATED APPLICATIONS

This U.S. non-provisional application is a continuation application of and claims the benefit of priority under 35 U.S.C. § 365(c) from PCT International Application PCT/JP2021/008457 filed on Mar. 4, 2021, which is designated the U.S., the entire contents of which are incorporated herein by reference.

TECHNICAL FIELD

The present disclosure relates to an information processing device, an information processing method, and an information processing system.

BACKGROUND ART

There has been a technique called simultaneous localization and mapping (SLAM) that obtains three-dimensional positional information on a solid object in the surroundings as point group information, and estimates the self-position and the position of the solid object in the surroundings. In addition, Visual SLAM (hereafter, referred to as VSLAM) that executes SLAM using image data captured by a camera has been known.

RELATED ART DOCUMENTS

Patent Documents

[Patent Document 1] Japanese Unexamined Patent Application Publication No. 2016-024598
[Patent Document 2] U.S. patent Ser. No. 10/726,570
[Patent Document 3] U.S. patent Ser. No. 10/719,759
[Patent Document 4] U.S. Patent Application Publication No. 2019/0094027

However, in the conventional techniques, there has been a problem in that the point group information output through a VSLAM process includes a considerable amount of noise. In addition, although it is conceivable to apply various filters in order to reduce such noise, it is difficult to appropriately set the filter coefficients of filters because the conditions of image data captured by a camera vary significantly depending on, for example, the sunshine condition and the imaging scene.

SUMMARY

According to an embodiment in the present disclosure, an information processing device includes a memory and a processor configured to obtain first point group information that represents three-dimensional positional information, by using image data captured by a first camera; output second point group information obtained by reducing noise of the first point group information, by using one or more filters; and set filter coefficients of the one or more filters, by using (i) a filter coefficient estimation model trained in advance by using (a) test data for learning that includes image data captured by a second camera and (b) training data based on third point group information that represents three-dimensional positional information obtained by a position sensor, and (ii) observation data that includes the image data captured by the first camera.

BRIEF DESCRIPTION OF DRAWINGS

FIG. 4A is a diagram (part 1) for describing a filtering process according to the first embodiment;
FIG. 4B is a diagram (part 2) for describing the filtering process according to the first embodiment;
FIG. 4C is a diagram (part 3) for describing the filtering process according to the first embodiment;
FIG. 4D is a diagram (part 4) for describing the filtering process according to the first embodiment;
FIG. 4E is a diagram (part 5) for describing the filtering process according to the first embodiment;
FIG. 8 is a flow chart illustrating an example of an obtainment process according to the first embodiment.

DESCRIPTION OF EMBODIMENTS

In the following, embodiments in the present disclosure will be described with reference to the accompanying drawings.

According to one embodiment in the present disclosure, the filter coefficients of one or more filters applied to point group information output through a VSLAM process can be set appropriately.

First Embodiment

An information processing device according to the present embodiment can be applied to various mobile objects, for example, an automobile, a robot, a drone, and the like. Here, an example in the case where the information processing device is provided in a vehicle, for example, an automobile or the like will be described.

<Overall Configuration>

Figure 1:
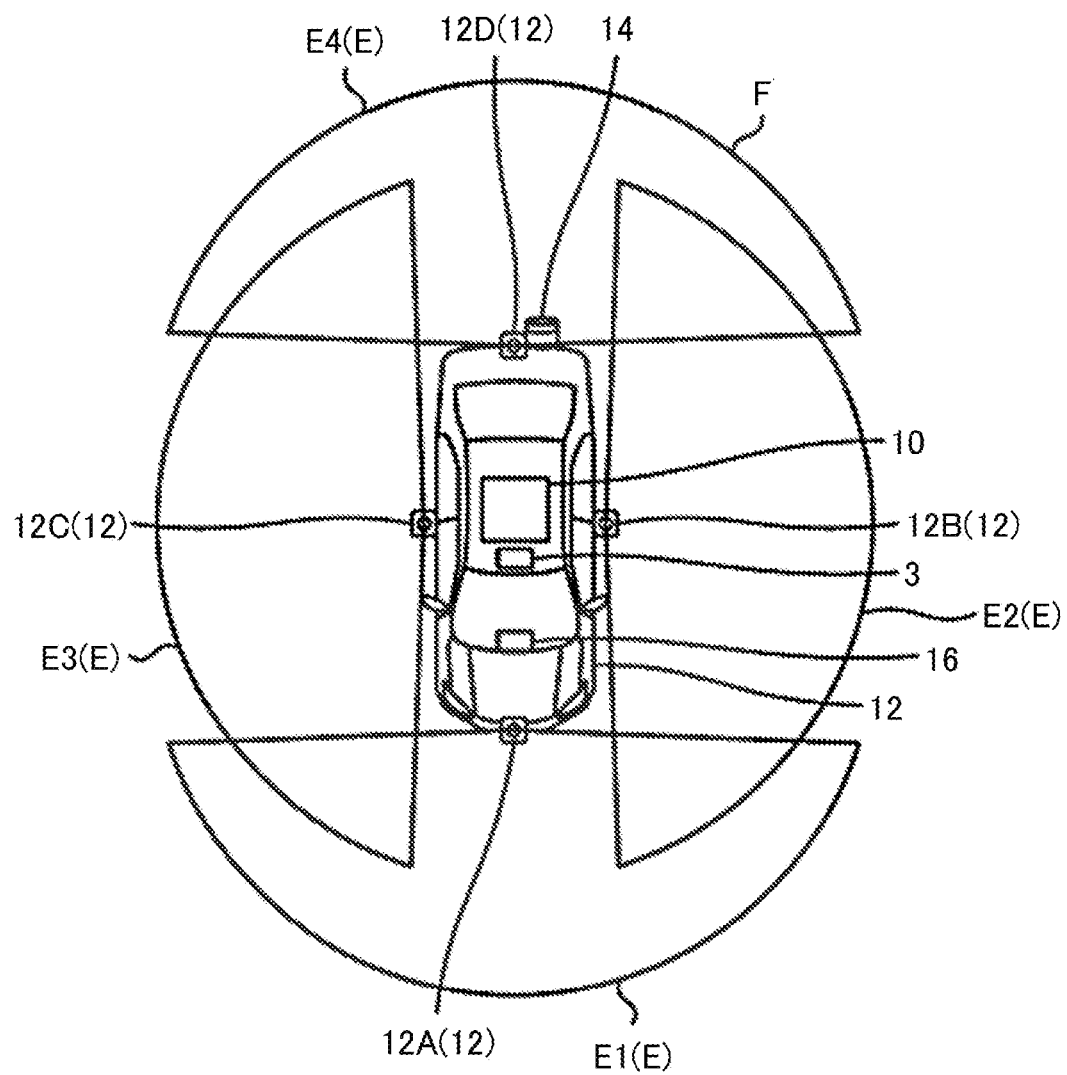
FIG. 1 is a diagram illustrating an example of an overall configuration of a vehicle on which an information processing device according to an embodiment is installed.

FIG. 1 is a diagram illustrating an example of an overall configuration of a vehicle on which an information processing device according to an embodiment is installed. The vehicle 1 includes an information processing device 10, one or more cameras 12, a position sensor 14, a display device 16, and the like. The components described above are communicably connected to each other by, for example, an in-vehicle network, wired cables, wireless communication, or the like.

Note that the vehicle 1 is an example of a mobile object on which the information processing device 10 according to the present embodiment is installed. The mobile object is not limited to the vehicle 1, and may be, for example, various devices or machines having a moving function such as a robot that moves with legs or the like, a manned or unmanned aircraft, or the like.

The camera 12 is an imaging device that captures images in the surroundings of the vehicle 1, converts the images into moving image data (hereafter, referred to as image data) in a predetermined format, and outputs the image data. In the example in FIG. 1, the vehicle 1 is provided with four cameras 12A to 12D that are directed toward imaging areas E1 to E4 different from each other. Note that in the following description, in the case of referring to any camera among the four cameras 12A to 12D, it will be referred to as the "camera 12". In addition, in the case of referring to any imaging area among the four imaging areas E1 to E4, it will be referred to as the "imaging area E". The numbers of cameras 12 and imaging areas E illustrated in FIG. 1 are examples, and may be another number being one or greater.

In the example in FIG. 1, as an example, the camera 12A is provided to be directed toward the imaging area E1 in front of the vehicle 1, and the camera 12B is provided to be directed toward the imaging area E2 on one side of the vehicle 1. In addition, the camera 12C is provided to be directed toward the imaging area E3 on the other side of the vehicle 1, and the camera 12D is provided to be directed toward the imaging area E4 on the rear side of the vehicle 1.

The position sensor 14 is a sensor to obtain point group information that represents three-dimensional positional information in the surroundings of the vehicle 1. As a favorable example, laser imaging detection and ranging (LIDAR) that measures scattered light with respect to laser light emitted in pulses, to obtain an image indicating the distance to an object can be applied to the position sensor 14. In the example in FIG. 1, as an example, the position sensor 14 is provided to be directed toward the rear side of the vehicle 1.

For example, the display device 16 is a liquid crystal display (LCD), a display device of organic electro-luminescence (EL) or the like, or a device from among various devices having a display function of displaying various types of information.

The information processing device 10 is a computer to execute a visual SLAM (hereafter, referred to as VSLAM) process that executes an SLAM (Simultaneous Localization and Mapping) process using image data captured by the cameras 12. The information processing device 10 is communicably connected to one or more electronic control units (ECUs) 3 installed on the vehicle 1 via an in-vehicle network or the like. Note that the information processing device 10 may be one of the ECUs installed on the vehicle 1.

<Hardware Configuration>

Figure 2:
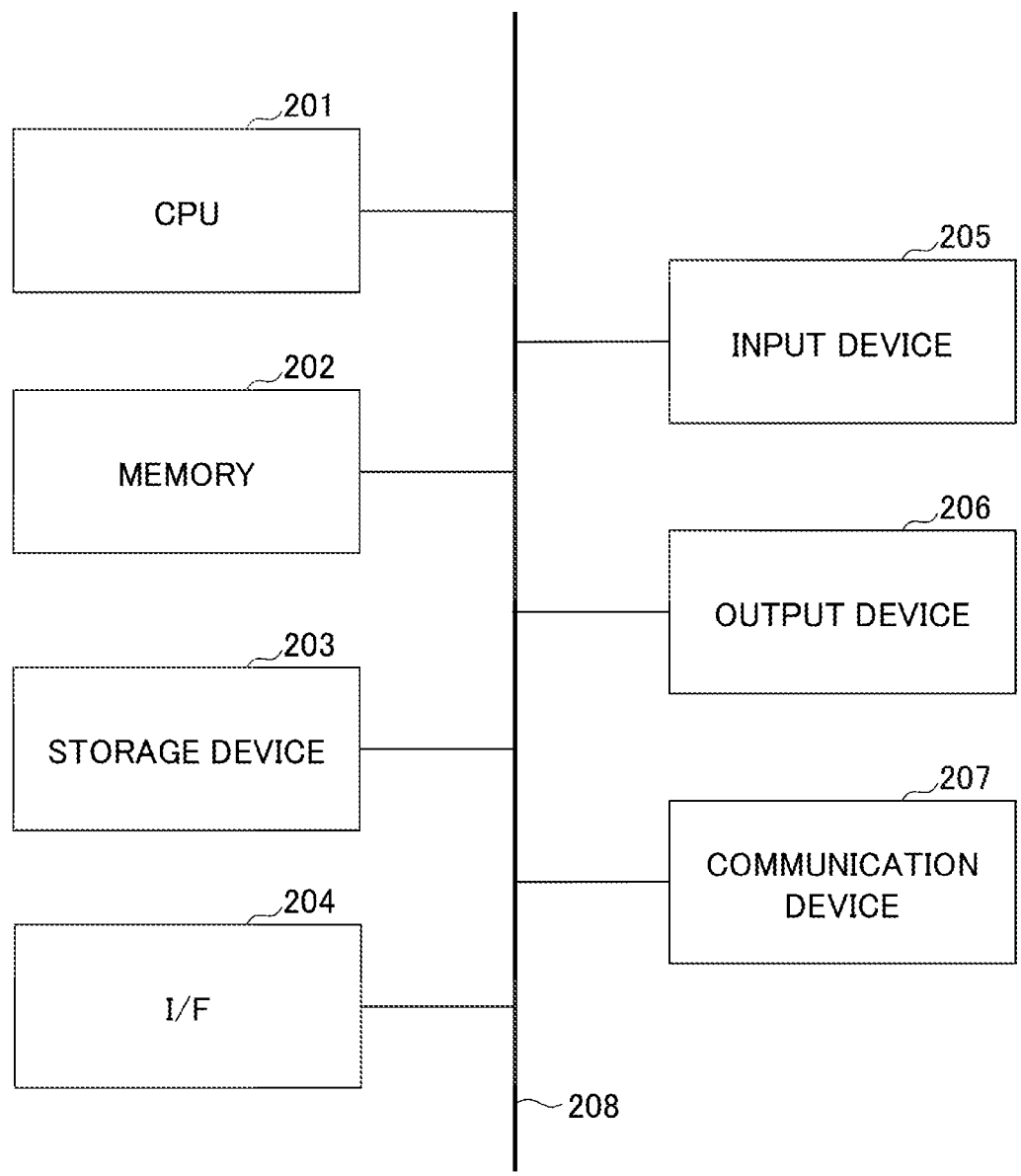
FIG. 2 is a diagram illustrating an example of a hardware configuration of an information processing device according to an embodiment.

FIG. 2 is a diagram illustrating an example of a hardware configuration of the information processing device according to an embodiment. The information processing device 10 has a configuration of a computer that includes, for example, a central processing unit (CPU) 201, a memory 202, a storage device 203, an interface (I/F) 204, a bus 208, and the like. In addition, the information processing device 10 may include an input device 205, an output device 206, a communication device 207, or the like.

The CPU 201 is, for example, a processor to implement functions of the information processing device 10 by executing a program stored on a recording medium such as the storage device 203. The memory 202 includes, for example, a random access memory (RAM) that is a volatile memory used as a work area or the like of the CPU 201; a read-only memory (ROM) that is a non-volatile memory storing a program or the like for activating the CPU 201; and the like. The storage device 203 is, for example, a large capacity storage device such as a solid state drive (SSD) or a hard disk drive (HDD). The I/F 204 includes various interfaces for connecting the cameras 12, the position sensor 14, the display device 16, the ECUs 3, and the like to the information processing device 10.

The input device 205 includes various devices to receive input from the outside (e.g., a keyboard, a touch panel, a pointing device, a microphone, a switch, a button, a sensor, or the like). The output device 206 includes various devices to execute output to the outside (e.g., a display, a speaker, an indicator, and the like). The communication device 207 includes various communication devices for executing communication with other devices via a wired or wireless network. The bus 208 is connected to the components described above to transmit, for example, an address signal, a data signal, various control signals, and the like.

Note that the hardware configuration of the information processing device 10 illustrated in FIG. 2 is an example. For example, the information processing device may include an application specific integrated circuit (ASIC) for image processing, a digital signal processor (DSP), or the like. In addition, the input device 205 and the output device 206 may be a display input device such as an integrated touch panel display, and may not be included in the information processing device 10.

<Functional Configuration>

Figure 3:
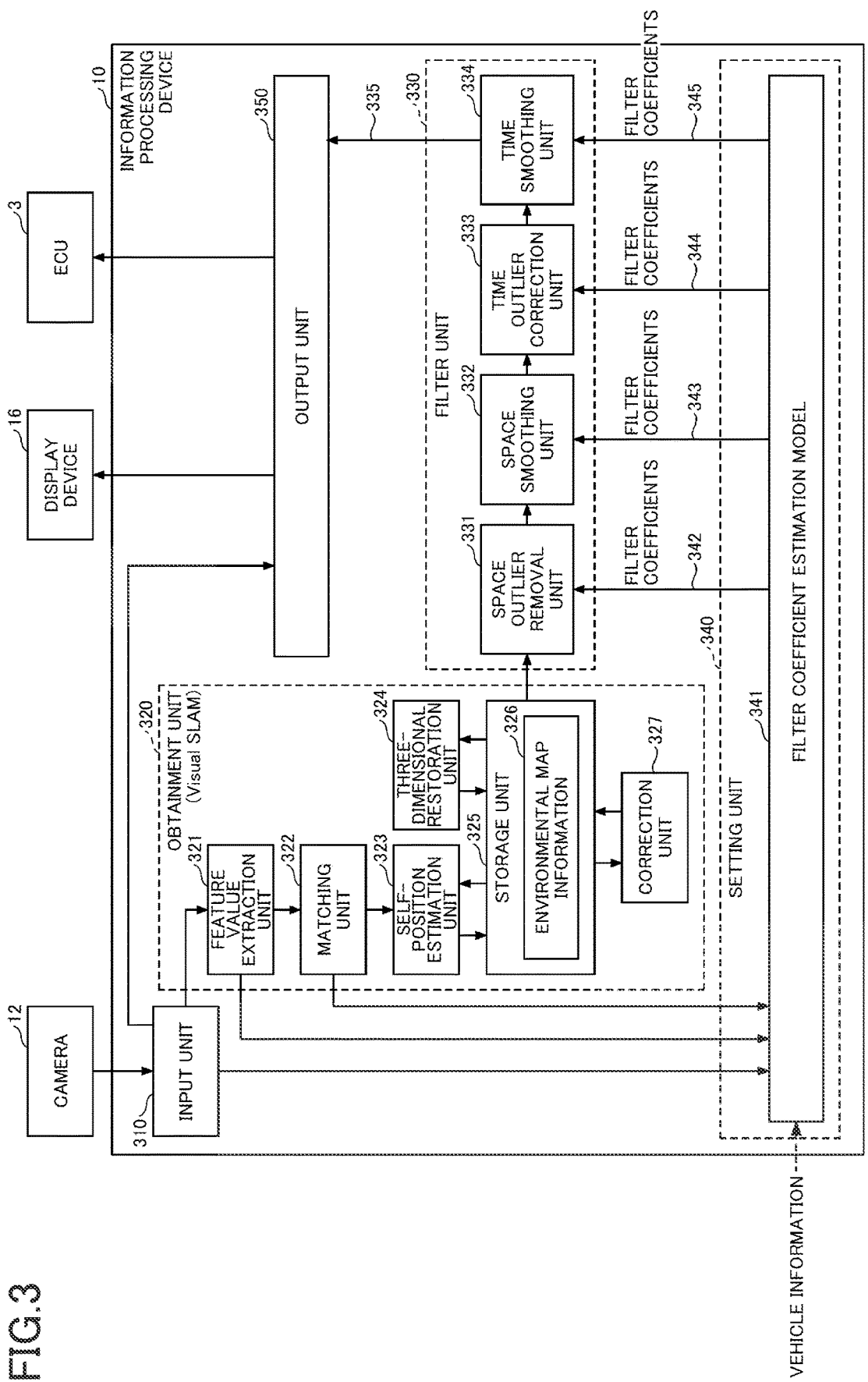
FIG. 3 is a diagram illustrating an example of a functional configuration of an information processing device according to a first embodiment.

FIG. 3 is a diagram illustrating an example of a functional configuration of the information processing device according to the first embodiment. The information processing device 10 implements an input unit 310, an obtainment unit 320, a filter unit 330, a setting unit 340, an output unit 350, and the like by executing a predetermined program, for example, by the CPU 201 in FIG. 2. Note that at least part of the functional units described above may be implemented by hardware. Note that here, in order to make the description easier, the following description assumes that the number of cameras 12 is one.

For example, by using the I/F 204 or the like in FIG. 2, the input unit 310 obtains image data (moving image data) captured by the camera 12 (first camera), and outputs the data to the obtainment unit 320, the setting unit 340, and the like.

The obtainment unit 320 executes an obtainment process of obtaining point group information (hereafter, referred to as first point group information) that represents three-dimensional positional information in the imaging area E of the camera 12 by executing a VSLAM process on the image captured by the camera 12. The obtainment unit 320 includes, for example, a feature value extraction unit 321, a matching unit 322, a self-position estimation unit 323, a three-dimensional restoration unit 324, a storage unit 325, a correction unit 327, and the like.

The feature value extraction unit 321 executes a feature value extraction process of extracting feature values from multiple frames that are included in the image data obtained from the input unit 310 and that have been captured at different timings, and outputs the extracted feature values to the matching unit 322. In addition, as a favorable example, the feature value extraction unit 321 outputs the number of features (hereafter, also referred to as the feature count) obtained in the feature value extraction process to the setting unit 340.

The matching unit 322 executes a matching process of identifying corresponding points (hereafter, referred to as matching points) among the multiple frames by using the feature values of the multiple frames output by the feature value extraction unit 321, and outputs the matching result to the self-position estimation unit 323. Note that the multiple frames are, for example, two consecutive frames. In addition, in the matching process, it is desirable to identify, for example, four or more matching points. In addition, as a favorable example, the matching unit 322 outputs the number of matching (hereafter, also referred to as the matching count) obtained in the matching process to the setting unit 340.

Here, environmental map information 326 is map information that represents an environment in the surroundings of the vehicle (an example of a mobile object) 1. In the environmental map information 326, positional information on each of the detection points and self-position information on the vehicle 1 are stored in a three-dimensional coordinate space having a predetermined position in the real space as the origin. The predetermined position in the real space may be determined based on, for example, a condition set in advance.

For example, the predetermined position may be a position of the vehicle 1 when the information processing device 10 starts executing information processing according to the present embodiment. For example, in the case where the information processing device 10 executes information processing in a parking scene of the vehicle 1, the position of the vehicle 1 when the vehicle 1 starts exhibiting a behavior indicating the parking scene may be set as the predetermined position. However, the timing to determine the predetermined position is not limited to such a parking scene.

By using the multiple matching points obtained from the matching unit 322, the self-position estimation unit 323 estimates a relative self-position with respect to the captured image by projective transformation or the like. Here, the self-position includes information on the position (three-dimensional coordinates) and inclination (rotation) of the camera 12, and the self-position estimation unit 323 stores the information in the environmental map information 326 as the self-position information.

The three-dimensional restoration unit 324 executes a perspective projection transformation process using the movement amount (translation amount and rotation amount) of the self-position estimated by the self-position estimation unit 323, to determine the three-dimensional coordinates (relative coordinates with respect to the self-position) of the matching point. The three-dimensional restoration unit 324 stores the determined three-dimensional coordinates in the environmental map information 326 as peripheral positional information. Accordingly, new peripheral positional information and self-position information are sequentially added to the environmental map information 326 as the vehicle 1 having the camera 12 installed moves.

The storage unit 325 is implemented, for example, by the memory 202 in FIG. 2 or the like, and stores various information items, for example, the environmental map information 326, data, programs, and the like.

For points matched multiple times among multiple frames, the correction unit 327 corrects the positional information and the self-position information registered in the environmental map information 326, so as to minimize the sum of differences in distance in the three-dimensional space between three-dimensional coordinates calculated in the past and three-dimensional coordinates newly calculated, for example, by using a least squares method or the like. Note that the correction unit 327 may correct the movement amount (translation amount and rotation amount) of the self-position used during the course of calculating the self-position information and the peripheral positional information.

Note that the configuration of the obtainment unit 320 described above is an example. The obtainment unit 320 according to the present embodiment simply needs to obtain the first point group information (the environmental map information 326) that represents the three-dimensional positional information through a VSLAM process by using image data captured by the camera, and the specific configuration may be another configuration.

The filter unit 330 uses one or more filters, to execute a filtering process that outputs point group information (hereafter, referred to as second point group information) in which noise of the first point group information (environmental map information) obtained through the VSLAM process by the obtainment unit 320 is reduced. In the example in FIG. 3, the filter unit 330 includes, as an example of one or more filters, a space outlier removal unit 331, a space smoothing unit 332, a time outlier correction unit 333, and a time smoothing unit 334.

The space outlier removal unit 331 executes an outlier removal process for a space at the same time, by using one or more filter coefficients (e.g., coefficients a, b, and c) set by the setting unit 340. For example, for each point, the space outlier removal unit 331 executes a distance-based outlier removal process c times such that the point is removed if the sum of the distances to a points (here, "a" represents an integer) in the surroundings is greater than or equal to a threshold value b. Alternatively, the space outlier removal unit 331 may execute, for example, a statistics-based outlier removal process c times such that the point is removed if the distances to a points in the surroundings are greater than or equal to (the average of a points in the surroundings) 35 (the standard deviation of a points in the surroundings)×b. Note that the coefficients a, b, and c are examples of the one or more filter coefficients 342 set by the setting unit 340 in the space outlier removal unit 331.

FIG. 4A is a diagram illustrating an image of an example of the space outlier removal process. The first point group information obtained through the VSLAM process by the obtainment unit 320 includes a considerable amount of noise, for example, like the point group information 411 illustrated in FIG. 4A. By the space outlier removal unit 331, point group information 412 in which the noise (unnecessary points) is removed (or reduced) from the point group information 411 is obtained.

The space smoothing unit 332 executes a smoothing process for a space at the same time, by using one or more filter coefficients (e.g., coefficients d and e) set by the setting unit 340.

FIG. 4B is a diagram illustrating an image of an example of a space smoothing process. The space smoothing unit 332 generates an image 421 in which the point group information 412 output by the space outlier removal unit 331 as illustrated in FIG. 4B is meshed with a number of meshes d. In addition, the space smoothing unit 332 can obtain smoothed point group information 422, for example, as illustrated in FIG. 4B, by forming a point group again from the meshed image 421 with a sampling interval e. Note that the coefficients d and e are examples of the one or more filter coefficients 343 set by the setting unit 340 in the space smoothing unit 332.

The time outlier correction unit 333 executes an outlier removal process on a data stream in the time direction, by using one or more filter coefficients (e.g., coefficients f, g, h, i, and j) set by the setting unit 340. For example, the time outlier correction unit 333 divides the three-dimensional space into unit cubes (f 3) with the self-position as the origin, and extracts unit cubes whose number of points is greater than or equal to a threshold value g. In addition, the time outlier correction unit 333 executes a removal/supplement process such that a valid unit cube is removed if the number of points is less than or equal to a threshold value i, or is added if the number of points is greater than or equal to a threshold value j, together with the past h frames in which the self-movement vector is subtracted. Note that the coefficients f, g, h, i, and j are examples of the one or more filter coefficients 344 set by the setting unit 340 in the time outlier correction unit 333.

FIG. 4C is a diagram illustrating an image of an example of a time outlier correction process executed by the time outlier correction unit 333. For example, when the space outlier correction process is executed on the point group information 422 output by the time outlier correction unit 333 as illustrated in FIG. 4C, in the point group information 422, a point that suddenly appears and does not exist in the past frames is removed, and a point that suddenly disappears and exists in the past frames is supplemented. Accordingly, from the point group information 422, point group information 431 in which noise and lack are corrected is obtained.

The time smoothing unit 334 executes a time smoothing process on a data stream in the time direction, by using one or more coefficients (e.g., coefficients k and l) set by the setting unit 340.

FIG. 4D is a diagram illustrating an image of an example of the time smoothing process. For example, the time smoothing unit 334 executes a weighted moving average process with a weight l on the point group information 431 output by the time outlier correction unit 333, for each valid unit cube defined by the time outlier correction unit 333, with k frames in the past in which the self-movement vector is subtracted. Accordingly, point group information 521 that is averaged (smoothed) while moving in the time direction is obtained. Note that the coefficients k and l are examples of the one or more filter coefficients 345 set by the setting unit 340 in the time smoothing unit 334.

By the processing described above, the filter unit 330 outputs second point group information in which noise of the first point group information obtained through the VSLAM process by the obtainment unit 320 is reduced.

Here, the characteristics of image data captured by the camera 12 vary significantly depending on the sunshine condition, the imaging scene, and the like; therefore, it is difficult to statically determine in advance one or more filter coefficients of the filter unit 330 commonly and appropriately for various conditions. FIG. 4E illustrates a combination example (strong NR) of filter coefficients suitable for observation data in which the point group noise increases, and a combination example (weak NR) of filter coefficients suitable for observation data in which the point group noise decreases.

Therefore, the information processing device 10 according to the present embodiment includes the setting unit 340 that dynamically sets one or more filter coefficients of the filter unit 330 according to moving image data captured by the camera 12.

By using a filter coefficient estimation model 341 trained in advance by machine learning and observation data that includes image data captured by the camera 12, the setting unit 340 executes a setting process of setting one or more filter coefficients of the filter unit 330.

Favorably, the filter coefficient estimation model 341 is a neural network that has been trained by using test data for learning that includes image data captured by a camera and training data based on point group information (hereafter, referred to as third point group information) obtained by the position sensor 14 such as a LIDAR.

Favorably, the test data for learning and observation data of the filter coefficient estimation model 341 include data such as the feature count indicating the number of feature values extracted by the feature value extraction unit 321, and the matching count indicating the number of feature values matched by the matching unit 322. In addition, the test data for learning and observation data of the filter coefficient estimation model 341 may include vehicle information obtained from the vehicle 1, such as vehicle speed information, gear information, and a parking mode (parallel or column) selected by the user. Here, as an example, the following description assumes that the test data for learning and observation data of the filter coefficient estimation model 341 include image data captured by the camera, the feature count output by the feature value extraction unit 321, and the matching count output by the matching unit 322.

The filter coefficient estimation model 341 is trained in advance so as to output filter coefficients with which a difference between the second point group information output by the filter unit 330 and the third point group information obtained by the position sensor 14 is less than or equal to a threshold value when the observation data described above is input. Here, the difference means the sum of distances as differences between positions of corresponding points obtained by executing the matching process on two sets of point group information.

As illustrated in FIG. 3, the setting unit 340 inputs the observation data including the image data output by the input unit 310, the feature count output by the feature value extraction unit 321, and the matching count output by the matching unit 322, into the filter coefficient estimation model 341. Accordingly, the filter coefficient estimation model 341 outputs filter coefficients 342 to 345 to be set in the filter unit 330 according to the observation data. The setting unit 340 sets the filter coefficients 342 to 345 output by the filter coefficient estimation model 341 to the filter unit 330. Accordingly, the setting unit 340 becomes capable of appropriately setting the filter coefficients of one or more filters applied to the point group information output through the VSLAM process. Note that the learning environment and the learning process of the filter coefficient estimation model 341 will be described later.

As an example, the output unit 350 outputs the noise-reduced second point group information 335 output by the filter unit 330 to another information processing device such as an ECU 3 provided in the vehicle 1. For example, the output unit 350 outputs the second point group information 335 output by the filter unit 330 to an ECU that supports driving, an ECU that controls automatic driving, or the like.

As another example, the output unit 350 may generate various display screens such as a display screen to display solid objects in the surroundings of the vehicle 1, to cause the display device 16 or the like to display the display screens, based on the second point group information 335 output by the filter unit 330.

<Processing Flow>

Next, a processing flow of the information processing method according to the present embodiment will be described with reference to FIG. 5. This processing flow illustrates an example of a process executed by the information processing device 10 described with reference to FIG. 3.

At Step S501, the input unit 310 obtains image data (moving image data) captured by the camera 12. In addition, the input unit 310 outputs the obtained image data to the obtainment unit 320 and the setting unit 340.

At Step S502, the feature value extraction unit 321 of the obtainment unit 320 executes a feature value extraction process of extracting feature values from multiple frames of image data obtained from the input unit 310, and outputs the extracted feature values to the matching unit 322. In addition, the feature value extraction unit 321 outputs a feature count indicating the number of extracted feature values to the setting unit 340.

At Step S503, the matching unit 322 of the obtainment unit 320 executes a matching process of identifying corresponding points between multiple frames, and outputs matching results to the self-position estimation unit 323 or the like, by using the feature values of the multiple frames output by the feature value extraction unit 321. In addition, the matching unit 322 outputs the matching count obtained in the matching process to the setting unit 340.

At Step S504, based on the matching result output by the matching unit 322, the self-position estimation unit 323 of the obtainment unit 320 executes a self-position estimation process, and the three-dimensional restoration unit 324 executes three-dimensional restoration. The correction unit 327 corrects the result of the self-position estimation process and the result of the three-dimensional restoration.

By the processing described above, the obtainment unit 320 can execute the VSLAM process on the image data captured by the camera 12, to obtain first point group information that represents three-dimensional positional information.

At Step S505, the setting unit 340 inputs the image data obtained from the input unit 310, the feature count obtained from the feature value extraction unit 321, and the matching count obtained from the matching unit 322, into the filter coefficient estimation model 341 as the observation data. Accordingly, the filter coefficient estimation model 341 outputs one or more filter coefficients (e.g., the coefficients a to l described above) of the filter unit 330 corresponding to the image data captured by the camera 12. The setting unit 340 sets the one or more filter coefficients output by the filter coefficient estimation model 341 to the filter unit 330.

At Step S506, the space outlier removal unit 331 of the filter unit 330 executes a space outlier removal process on the first point group information obtained from the obtainment unit 320, by using one or more filter coefficients set by the setting unit 340. For example, the space outlier removal unit 331 executes the space outlier removal process described above by using the coefficients a to c set by the setting unit 340.

At Step S507, by using one or more filter coefficients set by the setting unit 340, the space smoothing unit 332 of the filter unit 330 executes a space smoothing process on the point group information processed by the space outlier removal unit 331. For example, by using the coefficients d and e set by the setting unit 340, the space smoothing unit 332 executes the space smoothing process described above.

At Step S508, by using one or more filter coefficients set by the setting unit 340, the time outlier correction unit 333 of the filter unit 330 executes a time outlier correction process on the point group information processed by the space smoothing unit 332. For example, by using the coefficients f to j set by the setting unit 340, the time outlier correction unit 333 executes the time outlier correction process described above.

At Step S509, by using one or more filter coefficients set by the setting unit 340, the time smoothing unit 334 of the filter unit 330 executes a time smoothing process on the point group information processed by the time outlier correction unit 333. For example, by using the coefficients k and l set by the setting unit 340, the time smoothing unit 334 executes the time smoothing process described above.

By the processing described above, the filter unit 330 outputs second point group information in which noise of the first point group information obtained by the obtainment unit 320 is reduced, to the output unit 350 or the like.

At Step S510, the information processing device repeatedly executes the processing at Steps S501 to S509 until the process is completed (e.g., until an end command is received).

Figure 5:
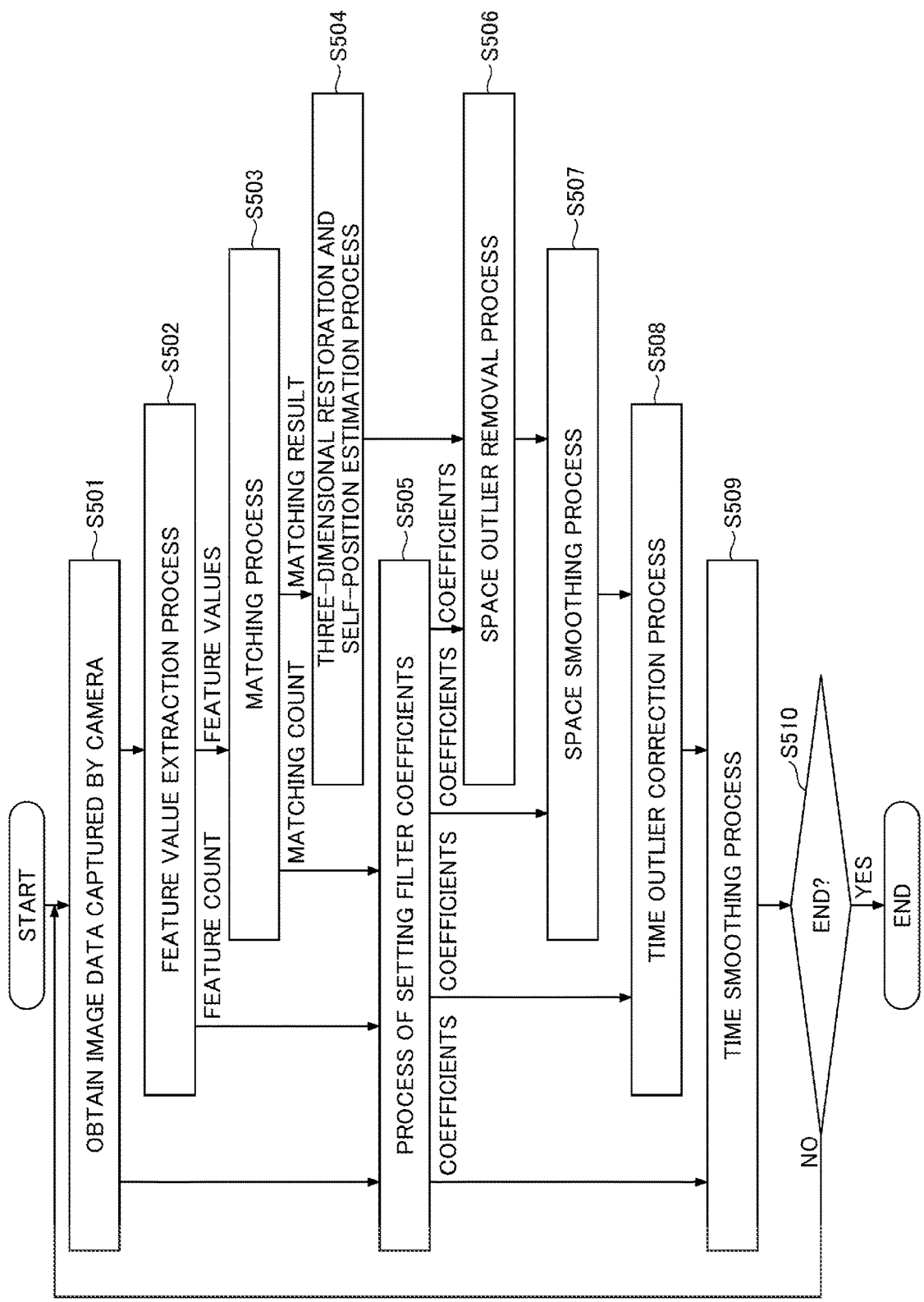
FIG. 5 is a flow chart illustrating an example of a process executed by the information processing device according to the first embodiment.

Note that the process executed by the information processing device 10 illustrated in FIG. 5 is an example. For example, the processing order of the four filters included in the filter unit 330 may be another order. In addition, the number of filters being four included in the filter unit 330 may be another number being one or greater.

In addition, in the setting process of filter coefficients at Step S505, the observation data input into the setting unit 340 does not need to include the feature count output by the feature value extraction unit 321 or the matching count output by the matching unit 322. Further, in the process of setting filter coefficients at Step S505, the observation data input into the setting unit 340 may include the vehicle information on the vehicle 1.

As above, according to the information processing device 10 in the present embodiment, the filter coefficients of one or more filters applied to first point group information output through a VSLAM process can be set appropriately. Accordingly, the information processing device 10 can output second point group information obtained by reducing noise of the first point group information output through the VSLAM process.

<Example of Use Scene>

The second point group information in which noise is reduced by the information processing device 10 according to the present embodiment can be suitably applied to a system that requires more accurate point group information, for example, an automatic driving system, a driving support system, or the like installed on a vehicle. In addition, the second point group information in which noise is reduced by the information processing device 10 can be applied not only to the vehicle 1 such as an automobile, but also to various mobile devices (mobile objects) such as a robot and a drone having a moving function.

In addition, the second point group information in which noise is reduced by the information processing device 10 can also be suitably applied to a technique that generates a composite image from any field of view, for example, by using a projection image obtained by projecting a captured image in the surroundings of the vehicle 1 onto a virtual projection surface. For example, based on the point group information in which noise is reduced by the information processing device 10 according to the present embodiment, the shape of a projection surface of a bird's-eye view image can be controlled by detecting solid objects in the surroundings of the vehicle 1.

For example, assume that the output unit 350 of the information processing device 10 displays a bird's-eye view image on the display device 16, by using a projection image obtained by projecting image data captured by the cameras 12A to 12D illustrated in FIG. 1 onto a bowl-shaped projecting surface.

Figure 6A:
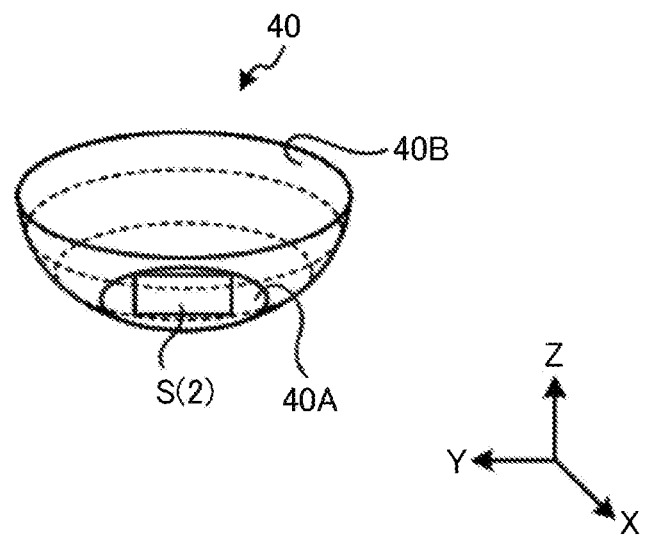
FIG. 6A is a diagram (part 1) for describing an application example of the information processing device according to the first embodiment.
Figure 6B:
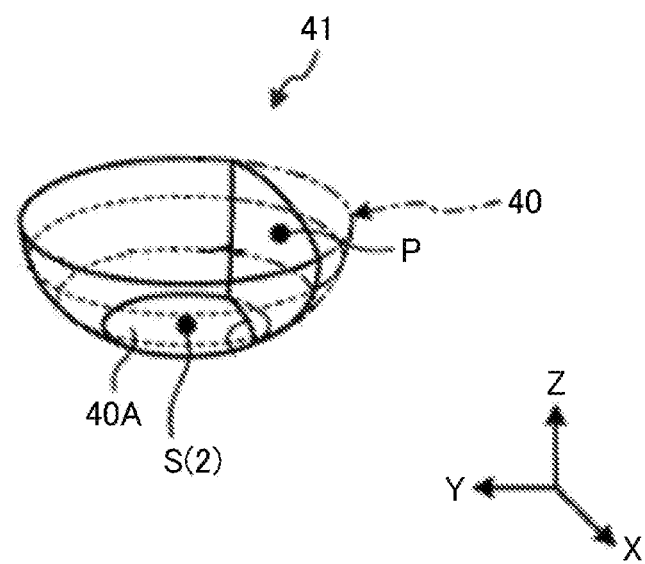
FIG. 6B is a diagram (part 2) for describing an application example of the information processing device according to the first embodiment.

FIG. 6A is a schematic diagram illustrating an example of a reference projection surface 40. FIG. 6B is a schematic diagram illustrating an example of a projection shape 41 determined by the output unit 350. The reference projection surface 40 has a bottom surface 40A and a sidewall surface 40B, and is a three-dimensional model virtually formed in a virtual space in which the bottom surface 40A is set as a surface substantially coincident with a road surface below the mobile object 2 such as the vehicle 1, and the center of the bottom surface 40A is set to be coincident with a self-position S of the mobile object 2.

Based on the peripheral positional information and the self-position information on the mobile object 2 stored in the environmental map information 326, the output unit 350 deforms the reference projection surface 40 illustrated in FIG. 6A, and determines a changed projection surface 42 as the projection shape 41 illustrated in FIG. 6B. This deformation of the reference projection surface is executed, for example, for three-dimensional coordinates closest to the vehicle 1 in the peripheral positional information.

Therefore, by using the point group information in which noise is reduced by the information processing device 10 according to the present embodiment, the output unit 350 can determine the changed projection surface 42 more appropriately.

In addition, by the information processing device according to the present embodiment, solid objects in the surroundings can be detected more accurately. Therefore, the output unit 350 may generate 3D objects of solid objects (vehicles, etc.) located in the surroundings in the bird's-eye view image, based on the point group information.

<Learning Data Obtaining Environment>

Configuration Example

Figure 7A:
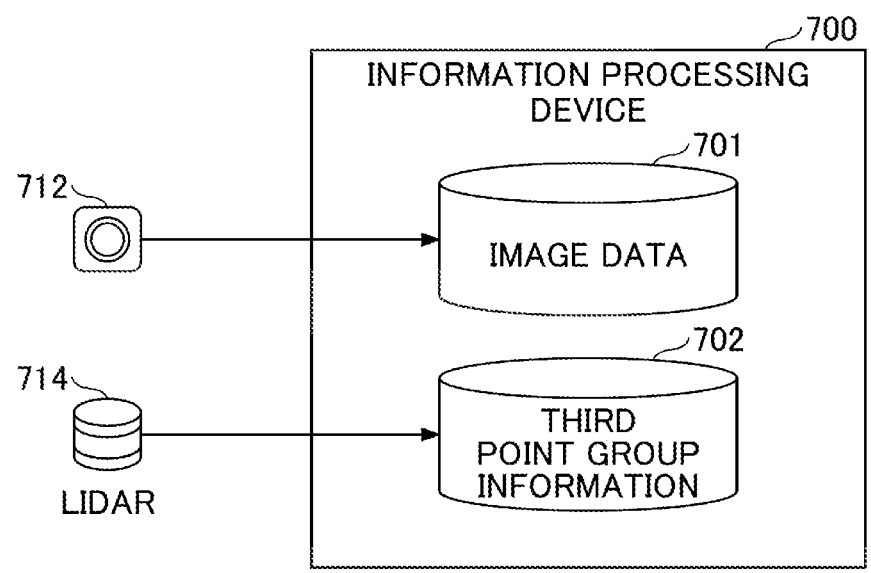
FIG. 7A is a diagram (part 1) illustrating an example of an environment in which data for learning is obtained according to the first embodiment.
Figure 7B:
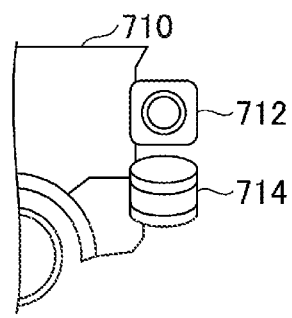
FIG. 7B is a diagram (part 2) illustrating an example of an environment in which data for learning is obtained according to the first embodiment.

FIGS. 7A and 7B illustrate an example of an environment in which data for learning is obtained according to the first embodiment. As illustrated in FIG. 7A, test data for learning and training data used upon training the filter coefficient estimation model (neural network) 341 are simultaneously obtained by the camera 712 connected to the information processing device 700 and the position sensor 714 such as a LIDAR.

The information processing device 700 has a hardware configuration of a computer, for example, as illustrated in FIG. 2. Note that the information processing device 700 may be the same information processing device as the information processing device 10 in FIG. 3, or may be a different information processing device.

The camera 712 and the position sensor 714 are provided in a mobile object such as a vehicle 710 so as to be close to each other and to be directed in the same direction, for example, as illustrated in FIG. 7B. Note that the camera (second camera) 712 in FIGS. 7A and 7B may be the same camera as the camera 12 in FIG. 3, or may be a different camera. In addition, the position sensor 714 may be the same position sensor as the position sensor 14, or may be a different position sensor.

(Obtainment Process of Learning Data)

FIG. 8 is a flow chart illustrating an example of an obtainment process according to the first embodiment. This process illustrates an example of a process of obtaining data for learning executed by the information processing device 700 in FIG. 7A.

At Steps S801 and S802, the information processing device 700 stores image data 701 captured by the camera 712 in the storage unit such as the storage device 203, and stores three-dimensional point group information (hereafter, referred to as third point group information 702) output by the position sensor 714 in another storage area of the storage unit. Note that the information processing device 700 executes the processing at Steps S801 and S802 simultaneously, and stores the image data 701 and the third point group information 702 so that these can be output in synchronization with each other, for example, by a time stamp or the like. Here, in order to output in synchronization with each other, the information processing device 700 may store the respective obtainment times of the image data 701 and the third point group information 702 such that correspondence between the obtainment times can be recognized. In addition, the correspondence between the obtainment times may be recognized with the obtainment times being the same time or being different around one second. In addition, the storage unit that stores the image data 701 and the third point group information 702 may be, for example, the storage device 203 or the like included in the information processing device 700, or may be an external device such as a storage server capable of communicating with the information processing device 700 via a communication network.

At Step S803, the information processing device 700 repeatedly executes the processing at Steps S801 and S802 until the process is completed (e.g., until an end command is received).

<Learning Environment>

Configuration Example

Figure 9:
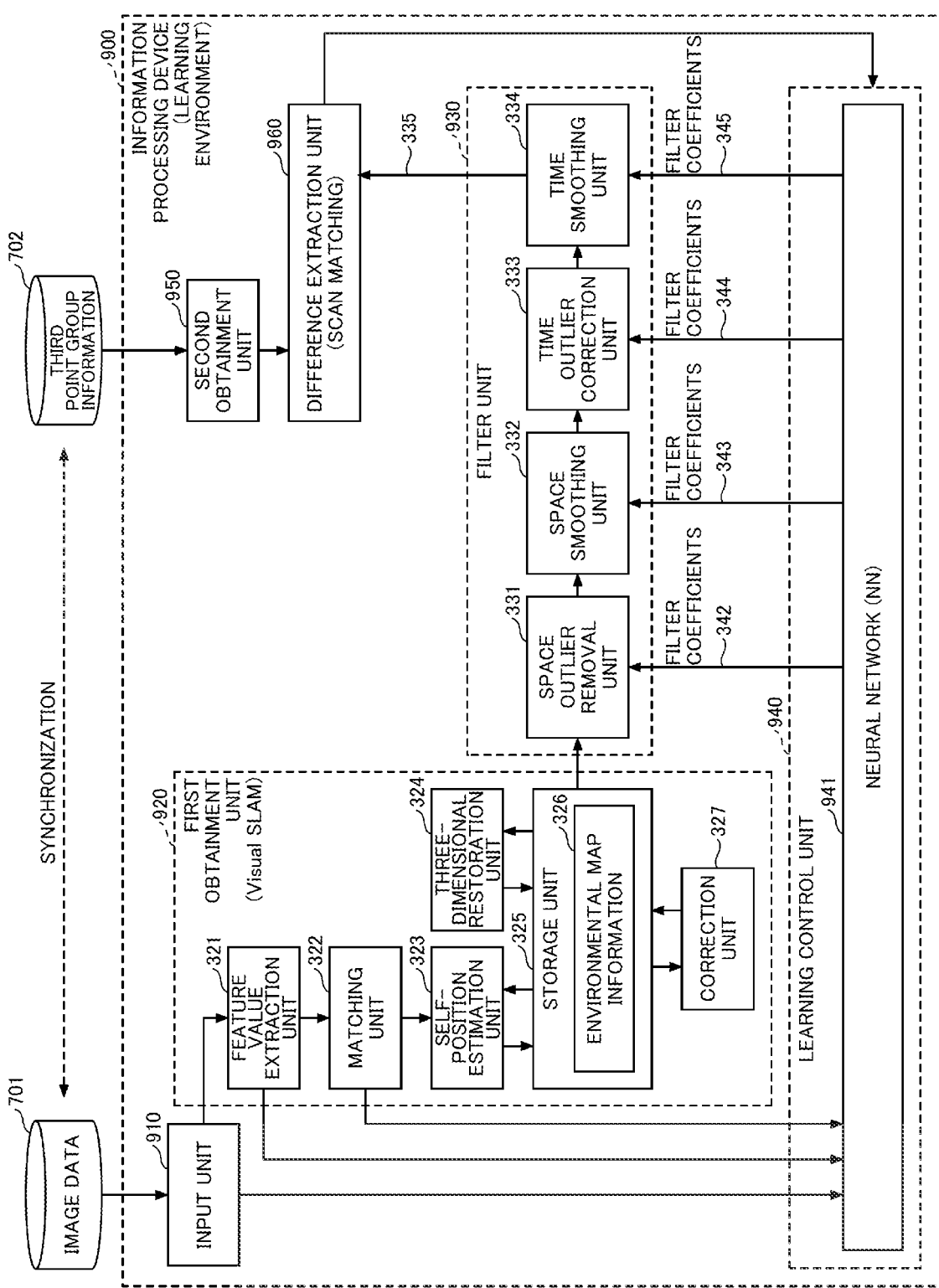
FIG. 9 illustrates an example of a learning environment according to the first embodiment.

FIG. 9 illustrates an example of a learning environment according to the first embodiment. The information processing device (learning environment) 900 has a hardware configuration of a computer, for example as illustrated in FIG. 2, and implements a functional configuration as illustrated in FIG. 9 by executing a predetermined program. For example, the information processing device 900 includes an input unit 910, a first obtainment unit 920, a filter unit 930, a learning control unit 940, a second obtainment unit 950, a difference extraction unit 960, and the like. Note that at least part of the functional units described above may be implemented by hardware.

The input unit 910 obtains an image data (moving image data) 701 captured by the camera 712, and outputs the image data to the first obtainment unit 920, the learning control unit 940, and the like.

The first obtainment unit 920 has a configuration substantially the same as that of the obtainment unit 320 illustrated in FIG. 3, and executes an obtainment process of obtaining first point group information that represents three-dimensional positional information is executed by executing a VSLAM process on the image data obtained by the input unit 910. Note that the internal configuration of the first obtainment unit 920 is substantially the same as that of the obtainment unit 320 described with reference to FIG. 3, and the description is omitted here.

The filter unit 930 has a configuration substantially the same as that of the filter unit 330 illustrated in FIG. 3, and by using one or more filters, outputs second point group information 335 in which noise of the first point group information obtained by the first obtainment unit 920 by the VSLAM process is reduced. Note that the internal configuration of the filter unit 930 is substantially the same as that of the filter unit 330 described with reference to FIG. 3, and the description is omitted here.

The second obtainment unit 950 obtains the third point group information 702 that represents the three-dimensional positional information obtained by the position sensor 714, and outputs the information to the difference extraction unit 960.

Using the third point group information 702 the third point group information 702 obtained by the second obtainment unit 950 as training data, the difference extraction unit 960 executes scan matching between the third point group information 702 and the second point group information 335 output by the filter unit 930, to extract a difference. Here, scan matching is a method of executing positional alignment on a point group using an algorithm such as iterative closest point (ICP) or normal distribution transform (NDT). According to this method, differences between positions of corresponding points in two point groups can be obtained as distances, and the sum of the distances can be obtained as the difference. For example, the difference extraction unit 960 executes scan matching on the third point group information 702 and the second point group information 335, and outputs the difference between the third point group information 702 and the second point group information 335 to the learning control unit 940.

By using the test data for learning that includes the image data 701 and the training data based on the third point group information 702, the learning control unit 940 trains a neural network (hereafter, referred to as an NN 941) to learn a relationship between the filter coefficients and the test data for learning in which the difference output by the difference extraction unit 960 is less than or equal to a threshold value.

In the example in FIG. 9, the learning control unit 940 inputs, as the test data for learning, the image data 701 obtained by the input unit 910, the feature count output by the feature value extraction unit 321, and the matching count output by the matching unit 322, into the NN 941. However, the data for learning is not limited as such, and may include, for example, vehicle information obtained from the vehicle 710 and the like.

For the first point group information, the learning control unit 940 selects numerical values to be set to the filter coefficients 342 to 345 at the outset, for example, randomly. Then, the learning control unit 940 repeats trials of the filtering process until a tendency of the difference as the output of the difference extraction unit 960 becoming smaller is clear. Sooner or later, the NN 941 learns a tendency of the filter coefficients 342 to 345 with which the difference as the output of the difference extraction unit 960 becomes smaller.

Thereafter, once the difference as the output by the difference extraction unit 960 reaches the threshold value or less, the same processing is executed on the first point group information based on the image data 701 of the next frame. In the meantime, while repeating the processing, the NN 941 learns a correlation between the filter coefficients 342 to 345 that reduces the difference as the output by the difference extraction unit 960 and the features of the test data for learning. Accordingly, according to the observation data (image data, feature count, and matching count), the information processing device 900 can generate a filter coefficient estimation model 341 that outputs one or more filter coefficients with which the difference between the third point group information 702 and the second point group information 335 is less than or equal to the threshold value.

(Learning Process)

Figure 10:
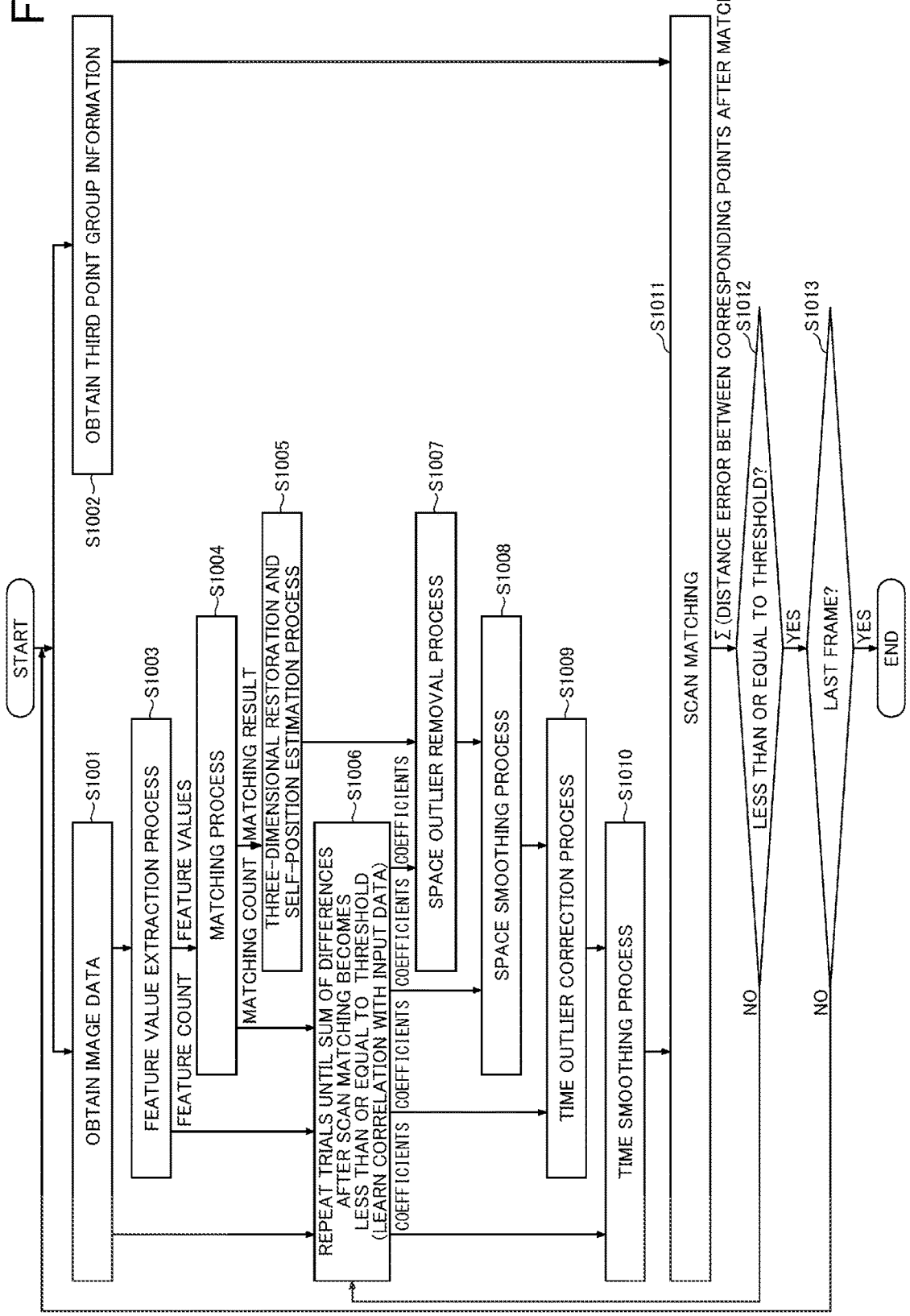
FIG. 10 is a flow chart illustrating an example of a learning process according to the first embodiment.

FIG. 10 is a flow chart illustrating an example of a learning process according to the first embodiment. This process illustrates an example of a learning process of the NN 941 executed by the information processing device 900 in FIG. 9.

At Step S1001, the input unit 910 obtains image data 701 captured by the camera 712. In addition, at Step S1002, the second obtainment unit 950 obtains third point group information 702 obtained by the position sensor 714 such as a LIDAR in synchronization with the processing at Step S1001. For example, the information processing device 900 causes the input unit 910 and the second obtainment unit 950 to refer to time stamps and the like of the image data 701 and the third point group information 702, so as to obtain the image data 701 and the third point group information 702 having corresponding obtainment times.

At Step S1003, the feature value extraction unit 321 of the first obtainment unit 920 executes a feature value extraction process of extracting feature values from multiple frames of the image data 701 obtained from the input unit 910, and outputs the extracted feature values to the matching unit 322. In addition, the feature value extraction unit 321 outputs a feature count indicating the number of extracted feature values to the learning control unit 940.

At Step S1004, by using the feature values extracted by the feature value extraction unit 321, the matching unit 322 of the first obtainment unit 920 executes a matching process of identifying corresponding points between multiple frames, and outputs matching results to the self-position estimation unit 323 or the like. In addition, the matching unit 322 outputs the matching count obtained in the matching process to the learning control unit 940.

At Step S1005, based on the matching result output by the matching unit 322, the self-position estimation unit 323, the three-dimensional restoration unit 324, and the correction unit 327 of the first obtainment unit 920 execute processes of three-dimensional restoration and self-position estimation.

By the processing described above, the first obtainment unit 920 can execute a VSLAM process on image data captured by the camera 12, to obtain first point group information that represents three-dimensional positional information.

At Step S1006, the learning control unit 940 inputs the image data 701 obtained from the input unit 910, the feature count obtained from the feature value extraction unit 321, and the matching count obtained from the matching unit 322, into the NN 941 as the test data for learning. In addition, the learning control unit 940 inputs the difference between the third point group information 702 obtained by the second obtainment unit 950 and output by the difference extraction unit 960, and the second point group information 335 output by the filter unit 930, into the NN 941. Further, the learning control unit 940 selects numerical values to be set to the filter coefficients 342 to 345 at the outset, for example, randomly.

At Step S1007, the space outlier removal unit 331 of the filter unit 330 executes a space outlier removal process using one or more filter coefficients (e.g., coefficients a to c) output by the NN 941.

At Step S1008, the space smoothing unit 332 of the filter unit 330 executes a space smoothing process using one or more filter coefficients (e.g., coefficients d and e) output by the NN 941.

At Step S1009, the time outlier correction unit 333 of the filter unit 330 executes a time outlier correction process using one or more filter coefficients (e.g., coefficients f to j) output by the NN 941.

At Step S1010, the time smoothing unit 334 of the filter unit 330 executes a time smoothing process using one or more filter coefficients (e.g., coefficients k and l) output by the NN 941.

At Step S1011, the difference extraction unit 960 executes scan matching between the third point group information 702 obtained by the second obtainment unit 950 and the second point group information 335 output by the filter unit 930. In addition, the difference extraction unit 960 outputs the sum of the differences (distance errors) between the corresponding points after the scan matching, to the learning control unit 940.

At Step S1012, in the case where the difference as the output of the difference extraction unit 960 is not less than or equal to the threshold value, the information processing device 900 returns the process to Step S1006. In this case, the learning control unit 940 selects numerical values that have not yet been selected as the numerical values to be set to the filter coefficients 342 to 345, and executes Steps S1007 to S1011. The learning control unit 940 repeats this processing until the difference output by the difference extraction unit 960 becomes less than or equal to the threshold value. Accordingly, the NN 941 learns a tendency of the filter coefficients 342 to 345 with which the difference as the output of the difference extraction unit 960 becomes smaller. Meanwhile, in the case where the difference as the output of the difference extraction unit 960 becomes less than or equal to the threshold value, the information processing device 900 causes the process to transition to Step S1013.

At Step S1013, if the last frame of the image data 701 is not reached, the information processing device 900 returns the process to Steps S1001 and S1002. At Steps S1001 and S1002, image data 701 and third point group information 702 of the next frame are obtained, and first point group information based on the next image data 701 is obtained by the processing from Steps S1003 to S1005. Then, the processing from Step S1006 to Step S1012 is repeated for the first point group information based on the next image data 701 until it is determined at Step S1012 that the difference as the output by the difference extraction unit 960 is less than or equal to the threshold value. Accordingly, the NN 941 learns a correlation between the filter coefficients 342 to 345 that reduces the difference as the output by the difference extraction unit 960 and the features of the data for learning. On the other hand, if the last frame of the image data 701 is reached, the information processing device 900 ends the process in FIG. 10.

By the processing described above, the information processing device 900 can train the NN 941, to obtain a filter coefficient estimation model 341.

As described above, according to the first embodiment, the filter coefficients of one or more filters applied to point group information output through a VSLAM process can be set appropriately.

Second Embodiment

The learning process executed by the information processing device 900 described in FIG. 10 may be executed by a cloud server or the like.

Figure 11:
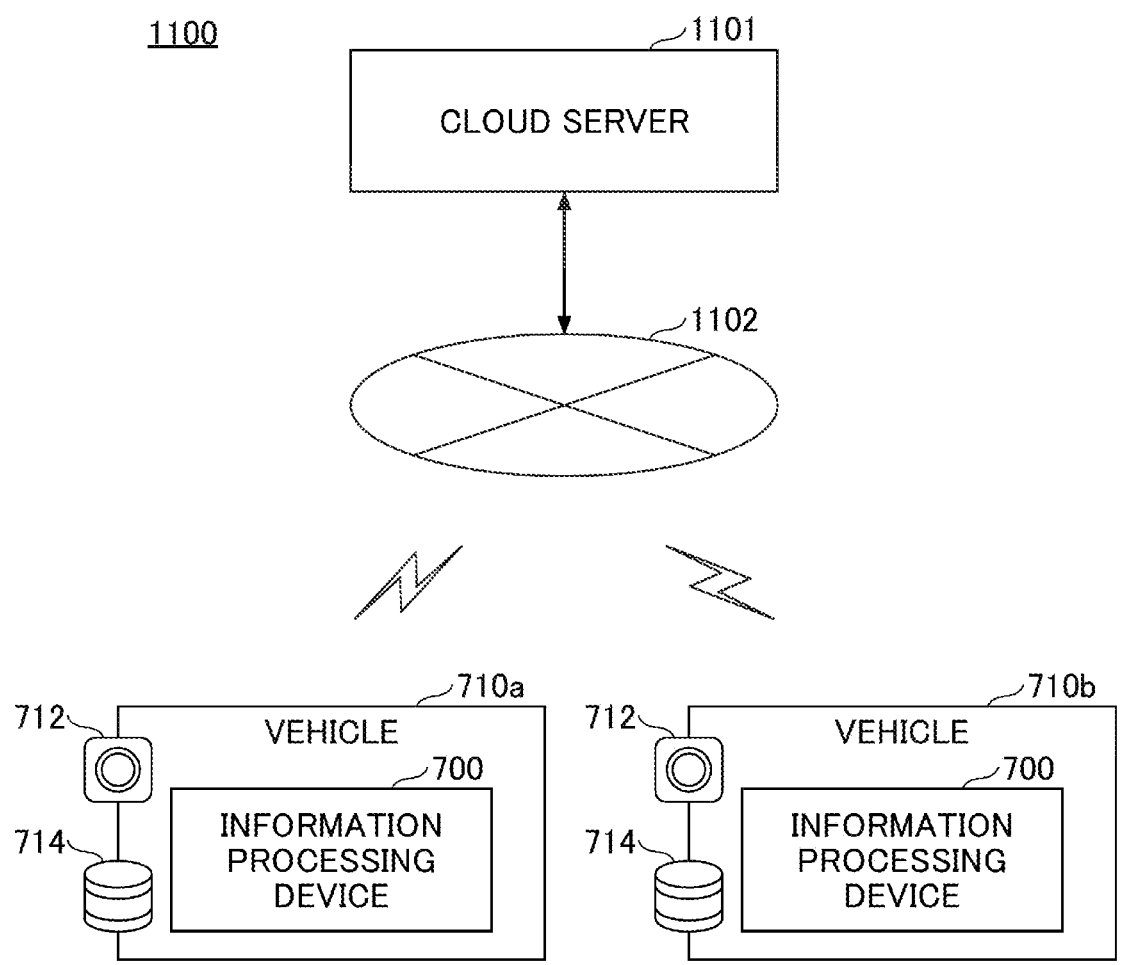
FIG. 11 is a diagram illustrating an example of a system configuration of an information processing system according to a second embodiment.

FIG. 11 is a diagram illustrating an example of a system configuration of an information processing system according to a second embodiment. In the example in FIG. 11, the information processing system 1100 includes, for example, a cloud server 1101 connected to a communication network 1102 such as the Internet, and multiple vehicles 710a, 710b, and so on, each of which includes a camera 712, a position sensor 714, and an information processing device 700. Note that in the following description, the "vehicle 710" is used for indicating any of the vehicles among the multiple vehicles 710a, 710b, and so on.

The information processing device 700 included in the vehicle 710 has, for example, a configuration of a computer as illustrated in FIG. 2, and can connect to the communication network 1102 by wireless communication using the communication device 207 to communicate with the cloud server 1101. In addition, as described with reference to FIG. 7A, the information processing device 700 can obtain image data 701 captured by the camera 712 and three-dimensional third point group information 702 obtained by the position sensor 714 such as a LIDAR.

The cloud server 1101 is a system that includes multiple computers, and can execute, for example, a learning process as described in FIG. 10 by using the image data 701 and the third point group information 702 obtained from the multiple vehicles 710a, 710b, and so on.

Figure 12:
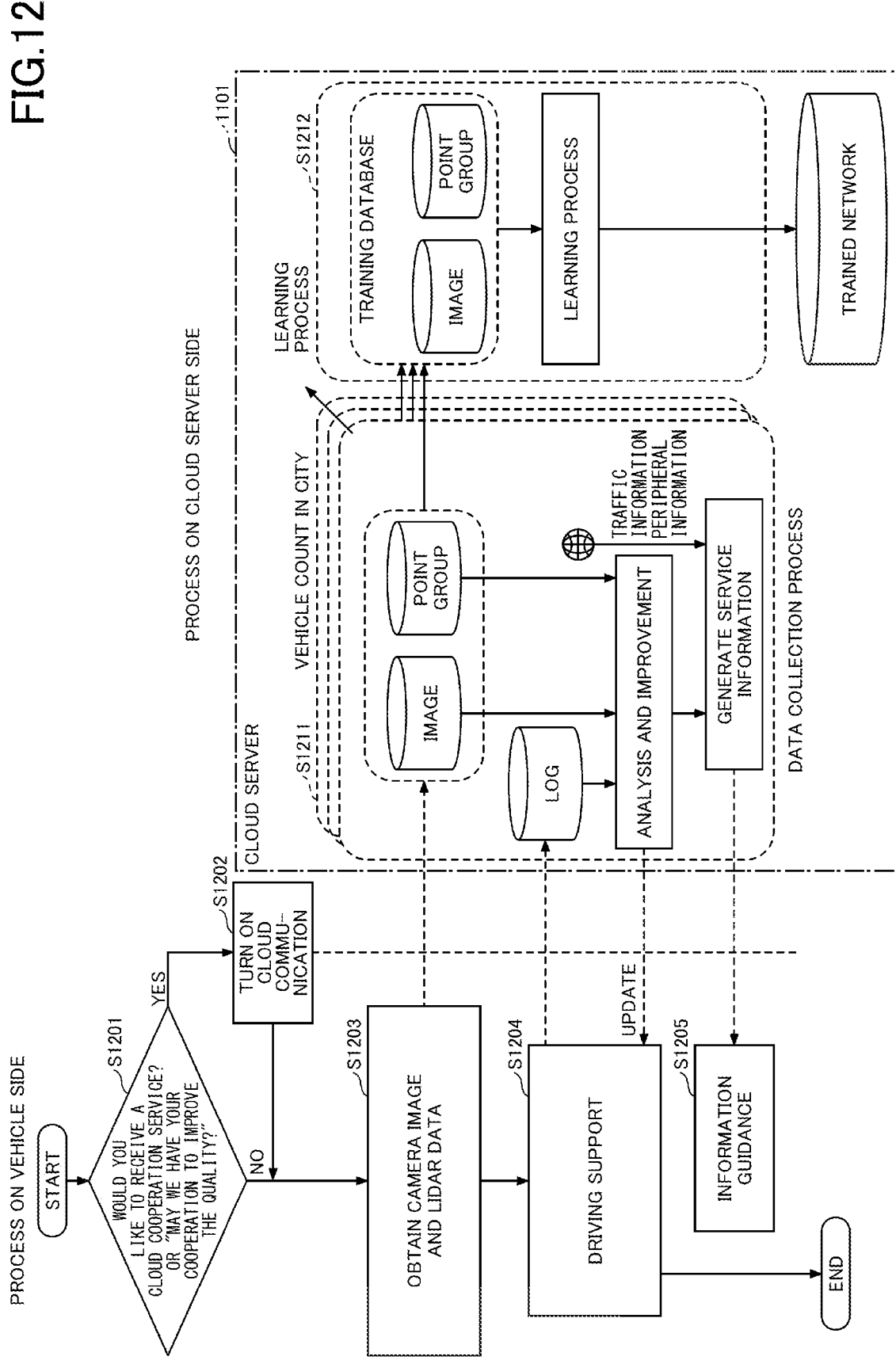
FIG. 12 is a diagram for describing an outline of a processes executed by the information processing system according to the second embodiment.

FIG. 12 is a diagram for describing an outline of a processes executed by the information processing system according to the second embodiment.

(Process on Vehicle Side)

As an example, each of the multiple vehicles 710a, 710b, and so on executes a process on the vehicle side as illustrated from Steps S1201 to S1205 in FIG. 12.

At Step S1201, the information processing device 700 displays a message such as "Would you like to receive a cloud cooperation service?" or "May we have your cooperation to improve the quality?" on the output device 206 or the like at a predetermined timing. In this way, it is desirable that the information processing device 700 obtains consent of the user before turning on (enabling) communication with the cloud server 1101 (hereafter, referred to as cloud communication).

If the consent of the user is obtained, at Step S1202, the information processing device 700 sets the cloud communication to be on, and starts communication with the cloud server 1101. On the other hand, if the consent of the user is not obtained, the cloud communication is maintained to be off.

At Step S1203, the information processing device 700 obtains image data 701 captured by the camera 712 and three-dimensional third point group information 702 obtained by the position sensor 714 such as a LIDAR. Here, if the cloud communication is turned on, the information processing device 700 transmits the obtained image data 701 and third point group information 702 to the cloud server 1101.

At Step S1204, an ECU or the information processing device 700 provided in the vehicle 710 executes a driving support process by using the obtained image data 701 and third point group information 702, for example, to support operations on an accelerator, a brake, a steering wheel, or the like. Alternatively, the ECU or the information processing device 700 included in the vehicle 710 may execute an automatic driving process or the like by using the obtained image data 701 and third point group information 702.

Here, if the cloud communication is turned on, the information processing device 700 transmits logs of the driving support process and the like to the cloud server 1101. Accordingly, for example, in the case where an update of a driving support function or the like is provided as an incentive from the cloud server 1101, the information processing device 700 updates the driving support function or the like by using the provided update.

In addition, if the cloud communication is turned on, for example, at Step S1205, in the case where service information is provided as an incentive from the cloud server 1101, the information processing device 700 may display the provided service information on the output device 206 or the like.

By the processing described above, in the case where the consent of the user is obtained, the cloud server 1101 can collect the image data 701 and the third point group information 702 from the multiple vehicles 710*a*, 710*b*, and so on. In addition, by turning on the cloud communication, the user can obtain an incentive; therefore, the image data 701 and the third point group information 702 can be collected from more vehicles 710.

(Process on Cloud Server Side)

As an example, the cloud server 1101 executes a process on the cloud server side as illustrated as Steps S1211 and S1212 in FIG. 12.

At Step S1211, the cloud server 1101 executes a data collection process of receiving image data 701 and third point group information 702 transmitted by one or more vehicles 710, and storing the data in a learning database or the like.

Favorably, the cloud server 1101 may receive logs of a driving support function transmitted from a vehicle 710, analyze and improve the driving support function of the vehicle 710 based on the received logs, the image data 701, the third point group information 702, and the logs, to update the driving support function.

In addition, the cloud server 1101 may collect, for example, traffic information, peripheral information, and the like, generate service information, to provide the generated service information to the vehicle 710 that has transmitted the image data 701 and the third point group information 702.

At Step S1212, the cloud server 1101 uses the image data 701 and the third point group information 702 accumulated in the learning database, to execute, for example, a learning process as illustrated in FIG. 10 to generate a trained NN (e.g., the filter coefficient estimation model 341). Note that at Step S1211, the cloud server 1101 may provide a newly trained NN to a vehicle 710 that has transmitted the image data 701 and the third point group information 702. In addition, the cloud server 1101 may provide the trained NN to a vehicle different from the vehicle 710 that has transmitted the image data 701 and the third point group information 702. In addition, the cloud server 1101 may install the trained NN in advance in a vehicle different from the vehicle 710 that has transmitted the image data 701 and the third point group information 702. In addition, a target on which the trained NN is installed in advance or to which the trained NN is provided by the cloud server may be a mobile object such as a robot, a drone, a heavy machine, an aircraft, a ship, or a railway vehicle having a moving function.

As described above, according to the embodiments in the present disclosure, the filter coefficients of one or more filters applied to point group information output through a VSLAM process can be set appropriately.

As above, the embodiments of the present inventive concept have been described in detail; note that the present inventive concept is not limited to such specific embodiments, and various modifications and changes can be made within the scope of the gist of the present inventive concept set forth in the claims.

What is claimed is:

1. An information processing device comprising:
a memory; and
a processor configured to:
extract feature values from a plurality of frames included in image data captured by a first camera, identify corresponding points between the plurality of frames and execute a visual simultaneous localization and mapping (Visual SLAM) process using the corresponding points to obtain first point group information that represents three-dimensional positional information;
output second point group information obtained by reducing noise of the first point group information, by using one or more filters; and
set filter coefficients of the one or more filters, by using (i) a filter coefficient estimation model trained in advance by using (a) test data for learning that includes image data captured by a second camera and (b) training data based on third point group information that represents three-dimensional positional information obtained by a position sensor, and (ii) observation data that includes the image data captured by the first camera, a feature count extracted in a feature value extraction process of the Visual SLAM, and a matching count of the corresponding points.

2. The information processing device as claimed in claim 1, wherein the filter coefficient estimation model is a neural network that is trained to learn filter coefficients of the one or more filters with which a difference between the second point group information and the training data is less than or equal to a threshold value.

3. The information processing device as claimed in claim 1, wherein the test data for learning and the observation data are obtained by using a vehicle, and include vehicle information on the vehicle.

4. The information processing device as claimed in claim 3, wherein the vehicle information includes vehicle speed information, gear information, or information on a parking mode selected by a user, on the vehicle.

5. The information processing device as claimed in claim 1, wherein the test data for learning and the training data are obtained by using a vehicle, and the position sensor includes a LIDAR installed on the vehicle.

6. An information processing system, comprising:
a computer including a memory and a processor configured to:
extract feature values from a plurality of frames included in image data captured by a first camera, identify corresponding points between the plurality of frames and execute a visual simultaneous localization and mapping (Visual SLAM) process using the corresponding points to obtain first point group information that represents three-dimensional positional information, by using image data captured by a camera;

output second point group information obtained by reducing noise of the first point group information, by using one or more filters;

obtain third point group information that represents the three-dimensional positional information obtained by a position sensor; and train a filter coefficient estimation model by using test data for learning that includes the image data and training data based on the third point group information, so as to output filter coefficients of the one or more filters with which a difference between the second point group information and the training data is less than or equal to a threshold value.

7. An information processing method executed by a computer including a memory and a processor, the information processing method comprising:

extracting feature values from a plurality of frames included in image data captured by a first camera, identify corresponding points between the plurality of frames and execute a visual simultaneous localization and mapping (Visual SLAM) process using the corresponding points to obtain first point group information that represents three-dimensional positional information, by using image data captured by a first camera;

outputting second point group information obtained by reducing noise of the first point group information, by using one or more filters; and setting filter coefficients of the one or more filters, by using (i) a filter coefficient estimation model trained in advance by using (a) test data for learning that includes image data captured by a second camera and (b) training data based on third point group information that represents three-dimensional positional information obtained by a position sensor, and (ii) observation data that includes the image data captured by the first camera, a feature count extracted in a feature value extraction process of the Visual SLAM, and a matching count of the corresponding points.

* * * * *